United States Patent
Doran et al.

[15] 3,673,817
[45] July 4, 1972

[54] BALL SPLINE ASSEMBLY

[72] Inventors: Leo F. Doran, Clawson; Theodore R. Schlenker, Troy, both of Mich.

[73] Assignee: Beaver Precision Products, Inc., Troy, Mich.

[22] Filed: Sept. 23, 1970

[21] Appl. No.: 74,691

[52] U.S. Cl. ............................................................64/23.7
[51] Int. Cl. ........................................................F16d 3/06
[58] Field of Search.....................64/23, 23.7, 17 A; 305/6

[56] References Cited

UNITED STATES PATENTS

| 3,143,867 | 8/1964 | Anderson | 64/23 |
| 3,364,699 | 1/1968 | Hufstedler et al. | 64/23.7 |

Primary Examiner—Edward G. Favors
Attorney—Wolfe, Hubbard, Leydig, Voit & Osann, Ltd.

[57] ABSTRACT

A sleeve and a splined shaft are coupled for rotation in unison and for relative linear movement by trains of anti-friction balls which circulate in pairs of load and return grooves circumferentially spaced from one another around the sized surface of the sleeve. The return grooves are size to receive the balls with free running clearance, and the balls are always in an unloaded or free return condition while traveling in the return grooves, the same grooves serving as return grooves at all times regardless of the direction of rotation of either the sleeve or the shaft. The load grooves are smaller than the return grooves, and the balls in alternate ones of the load grooves are loaded and transmit torque in one direction of rotation while the balls in the other load grooves are loaded and transmit torque in the opposite direction of rotation. If desired, the balls may be sized to fit between the load grooves and the shaft with zero clearance to establish an anti-backlash fit between the shaft and the sleeve. Also, the sleeve may be preloaded on the shaft simply by using balls sufficiently large to be deformed plastically between the load grooves and the shaft.

7 Claims, 3 Drawing Figures

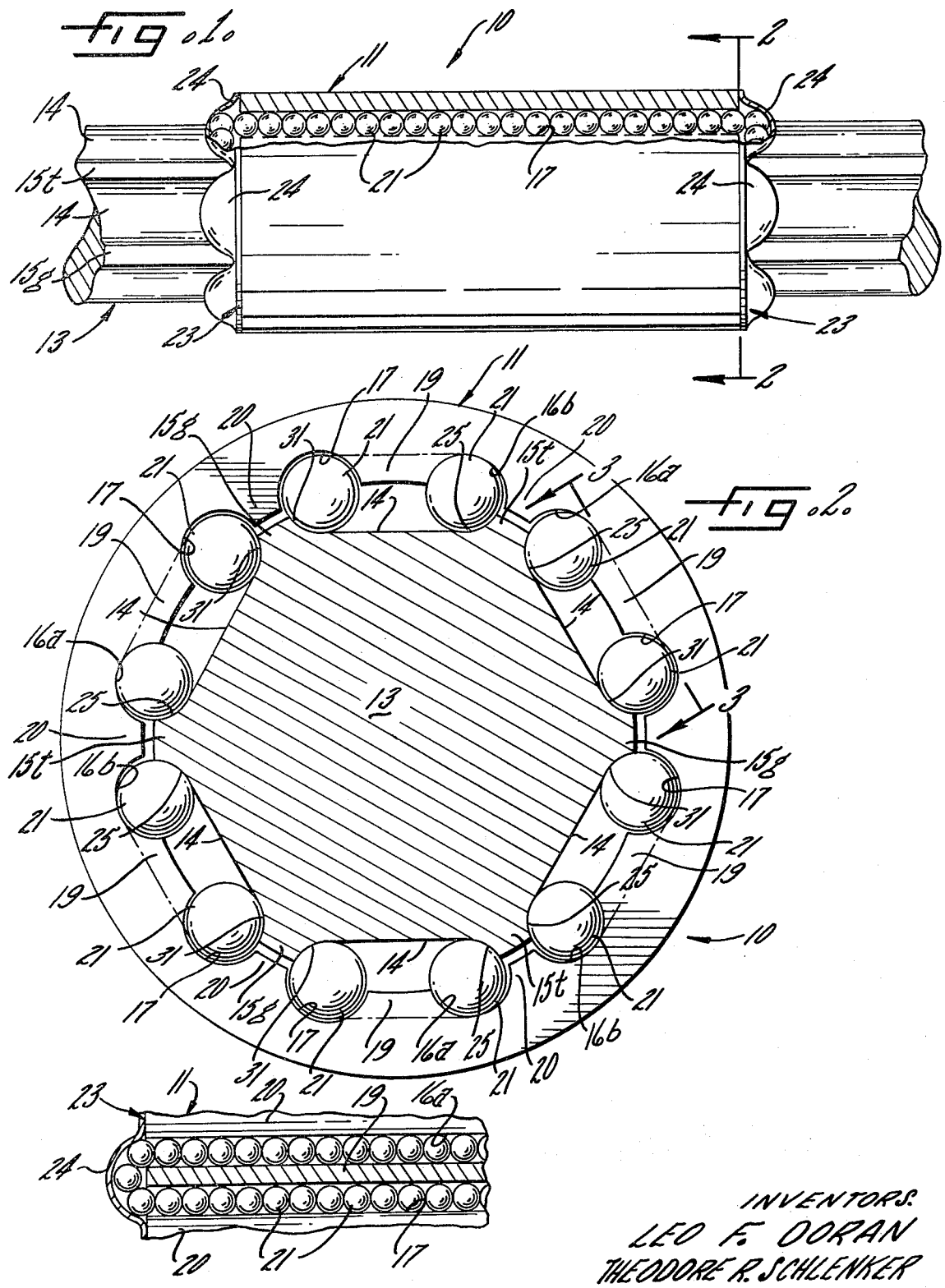

3,673,817

1

BALL SPLINE ASSEMBLY

BACKGROUND OF THE INVENTION

This invention relates to a ball spline assembly and, more particularly, to an assembly comprising inner and outer telescoped members which are coupled together for rotation in unison and for linear movement relative to one another by one or more trains of anti-friction bearing balls interposed between the two members and adapted to circulate within load and return runs. The load runs are defined in part by grooves located between the members and formed in one of the members, the balls being received in the grooves and engaging radially projecting ribs on the other member to transmit torque between the members. In order to reduce the outside diameter of the overall assembly and to provide a more compact assembly, certain prior assemblies have been designed with internal return runs, that is to say, the return runs are defined by grooves which also are located between the two telescoped members rather than by grooves spaced radially from the load grooves. Prior assemblies of this general type are disclosed in U.S. Pat. Nos. 1,918,108; 2,791,894; 2,908,152 and 3,304,745.

SUMMARY OF THE INVENTION

The primary aim of the present invention is to provide a new and improved ball spline assembly which is of compact construction with internal return grooves but which optionally may be easily manufactured in such a manner as to maintain the balls in the load grooves in a tight anti-backlash or even a preloaded condition between the load grooves and the torque transmitting ribs while maintaining the balls in the return grooves in an unloaded condition at all times.

A more detailed object is to accomplish the foregoing through the provision of a novel ball spline assembly with internal return grooves which always maintain the balls therein in an unloaded condition and serve only as return grooves regardless of the direction of rotation of either of the telescoped members. In addition, the load grooves of the assembly serve only as load grooves and the balls may be selectively sized to fit therein and against the ribs with an anti-backlash fit or in a preloaded condition with the balls in alternate ones of the load grooves being loaded and transmitting torque when one of the members is rotated in one direction and with the balls in the other load grooves being loaded when such member is rotated in the opposite direction.

The invention also resides in the unique difference between the sizing of the load and return grooves and in the novel positioning of the grooves relative to the ribs to enable the balls to be sized to couple the members with an anti-backlash fit while allowing substantially free return of the balls in an unloaded condition.

These and other objects and advantages of the invention will become apparent from the following detailed description taken in connection with the accompanying drawings.

BRIEF DESCRIPTION OF THE DRAWINGS

FIG. 1 is a fragmentary side elevation of a new and improved ball spline assembly embodying the novel features of the present invention, parts being broken away and shown in section.

FIG. 2 is an enlarged cross section taken along the line 2—2 of FIG. 1.

FIG. 3 is a fragmentary cross section, on a reduced scale, taken substantially along the line 3—3 of FIG. 2.

DETAILED DESCRIPTION OF THE PREFERRED EMBODIMENT

As shown in the drawings for purposes of illustration, the invention is embodied in a ball spline assembly 10 including an outer member or sleeve 11 telescoped over an inner member in the form of a splined shaft 13 and capable of being moved linearly relative to the shaft while being rotatable in unison with the shaft. The sleeve, for example, may be anchored to a rotary member (not shown) which turns with the sleeve as the shaft is rotated and which is shifted along the shaft with the sleeve. Alternatively, the sleeve may be rotated to turn the shaft and may be held in an axially fixed position while the shaft is advanced through the sleeve.

In this particular instance, the shaft 13 is formed with six circumferentially spaced and axially extending channels 14 (FIG. 2) which alternate with six radially projecting ribs 15 designated as 15g and 15t in the drawings. Formed around and extending along the inner side of the sleeve 11 are six circumferentially spaced pairs of circumferentially spaced grooves 16 and 17 which open toward the shaft, the grooves 16 having been designated as 16a and 16b in the drawings. The grooves of each pair are separated by comparatively wide lands 19 projecting inwardly from the sleeve while adjacent pairs of grooves are separated by narrower inwardly projecting lands 20. Each pair of grooves is disposed between adjacent ones of the ribs 15 and each pair is associated with one of the channels 14, the grooves being spaced radially outwardly from the channels.

An endless train of spherical anti-friction balls 21 is captivated within each pair of grooves 16 and 17 and the associated channel 14 to circulate axially therealong as the sleeve 11 is moved relative to the shaft 13 so as to reduce friction between the sleeve and the shaft. Also, the balls engage certain ones of the lands 19 and 20 and the ribs 15 as they circulate and serve to transmit torque between the shaft and the sleeve as one or the other is rotated. In circulating from the grooves 16 to the grooves 17, or vice versa, the trains of balls 21 roll around the ends of the lands 19 and transversely across the channels 14 in the shaft 13. The balls are retained in the sleeve by end caps 23 (FIGS. 1 and 3) suitably secured to each end of the sleeve and each formed with six circumferentially spaced pockets 24 of semi-circular cross section positioned opposite the ends of the pairs of grooves. Thus, the balls roll chordwise and circular fashion across the shaft and into the pockets 24 as they circulate between one groove of a pair and the other groove of the pair.

As a result of the arrangement of the circumferentially spaced grooves 16 and 17 and the end caps 23 with the chordally extending pockets 24, the circuit for each train of balls 21 is internal, that is, the circuits for the most part are located between the sleeve 11 and the shaft 13 so that the overall diameter of the spline assembly 10 for a shaft of a given size can be made small as compared to those types of assemblies in which the balls circulate radially between a load groove located between the shaft and the sleeve and a return groove spaced radially outwardly from the load groove. An assembly of the latter type is disclosed in Sears U.S. Pat. No. 2,945,366.

In accordance with the present invention, the ball spline assembly 10, while being comparatively compact as a result of having internal circuits for the balls 21, is arranged in a novel manner so that, if desired, the manufacturer of the assembly may easily construct the assembly such that the balls establish a tight anti-backlash fit between the sleeve 11 and the shaft 13 and thereby prevent rotational play or lost motion between the two at all times. The balls are, however, always left free to recirculate with little restraint so as to avoid impeding linear movement of the sleeve relative to the shaft.

To achieve the foregoing, the grooves 16 serve only as load grooves and are sized to receive the balls 21 with less clearance than the grooves 17. When the shaft 13, for example, is rotated clockwise, the balls in alternate ones of the load grooves (i.e., the grooves 16a) are loaded fully and transmit the torque from the ribs 15 to the sleeve 11. The balls in the remaining load grooves 16b simply circulate idly or under reduced load and do not transmit torque. When the shaft is rotated counterclockwise, however, the balls 21 in the grooves 16b are loaded fully and transmit torque while the balls in the grooves 16a circulate idly or under reduced load. At the option of the manufacturer of the assembly 10, the balls may be sized to fit into the load grooves 16a and 16b and against the ribs 15 with zero clearance to establish an anti-backlash fit between the shaft and the sleeve. The grooves 17, however, are always sized to receive the balls with greater clearance than the load grooves and simply serve to return the balls to the load grooves at all times regardless of the direction of rotation of either the shaft or the sleeve. As a result, the balls are always unloaded or under reduced load when traveling in the return grooves 17 and circulate comparatively freely therein to enable the balls in the load grooves 16a and 16b to travel without impeding relative linear movement between the shaft and the sleeve.

More specifically, the load grooves 16a and 16b of each adjacent pair of grooves are disposed adjacent one another and on opposite sides of the intervening rib 15. The load grooves 16a and 16b are of semi-circular cross section and coact with the sides of the intervening ribs to define load runs for the balls, such ribs being radiused along their sides as indicated at 25 in FIG. 2. In this particular instance, the assembly 10 is of the anti-backlash type and thus the balls 21 selected for use with the assembly are sized relative to the load grooves so as to fit tightly between the grooves and the sides of the ribs with substantially zero clearance to establish an anti-backlash fit between the sleeve 11 and the shaft 13.

The return grooves 17 of adjacent pairs of grooves are disposed adjacent one another on opposite sides of alternate ribs 15, the sides of such ribs also being radiused as indicated at 31 in FIG. 2. Each return groove 17 also is of semi-circular cross section but is formed with a greater radius than the radii of the load grooves 16a and 16b. Thus, the balls fit rather loosely in the return grooves 17 and may circulate freely within the return grooves and alongside the ribs disposed between such grooves.

With the foregoing arrangement, only the three ribs 15 disposed between the load grooves 16a and 16b serve as torque transmitting ribs and thus these ribs have been designated by the reference numeral 15t. If the shaft 13 is rotated clockwise or the sleeve 11 rotated counterclockwise, the balls in the load grooves 16a are loaded between the grooves and the sides of the ribs 15t to transmit torque between the shaft and the sleeve. The balls in the load grooves 16b are not placed under load and circulate without transmitting torque. If the shaft 13 is rotated counterclockwise or the sleeve 11 rotated clockwise, the balls 21 in the load grooves 16b are loaded between the grooves and the sides of the ribs 15t and transmit torque while the balls in the load grooves 16a circulate without transmitting torque. Because of the anti-backlash fit between the balls 21, the torque transmitting ribs 15t and the load grooves 16a and 16b, the angular position of the shaft 13 relative to the sleeve 11 cannot substantially change and thus torque is transmitted between the two without any rotary play or lost motion.

Regardless of the direction of rotation of either the sleeve 11 or the shaft 13, the balls 21 in the larger return grooves 17 always remain unloaded and circulate freely in the grooves. The three ribs 15 disposed between the return grooves 17, being held in a fixed angular position relative to the grooves by the balls in the load grooves 16a and 16b, never transmit torque and function only to guide the balls as they circulate. These guide ribs thus have been designated by the reference numeral 15g. The actual positions of the balls relative to the guide ribs 15g and the return grooves 17 will vary somewhat from the positions shown in FIG. 2 depending upon the influences of gravity and centrifugal force.

Another important advantage of the invention is that the balls 21 also can be actually placed in a preloaded condition in the load grooves to positively insure against the existence of any rotary play between the sleeve 11 and the shaft 13 even though the dimensions of the balls and the grooves 16a and 16b fall near opposite extremes of permissible tolerance ranges. Preloading of the balls is accomplished simply by using at least one train of balls whose minimum radii are sufficiently large that the balls will be plastically deformed to a slight extent as the balls enter the load groove associated with the train. Thus, the balls will be under a slight load at all times while in the load grooves so as to avoid rotary play between the sleeve and the shaft and to enable the assembly 10 to transmit torque with minimum torsional deflection.

From the foregoing, it will be apparent that the present invention brings to the art a comparatively compact ball spline assembly 10 with internal return grooves 17. While the balls can be fitted into the load grooves 16a, 16b with clearance as in a standard, non-precision assembly, an anti-backlash or preloaded assembly may be provided simply by selecting and using balls 21 of appropriate diameter. Thus, either standard, anti-backlash or preloaded assemblies may be supplied from a single inventory of identical sleeves 11 and shafts 13.

We claim as our invention:

1. In a ball spline assembly, the combination of, inner and outer telescoped members adapted for rotation in unison and for relative linear movement, said inner member having a series of circumferentially spaced channels alternating with outwardly projecting ribs, said outer member having circumferentially spaced pairs of circumferentially spaced grooves with the grooves of each pair associated with one of the channels, a train of anti-friction balls captivated in each pair of grooves to circulate therein and in the associated channel as an incident to relative linear movement of said members, one groove of each pair defining a return run sized to receive the balls with clearance to enable the balls to circulate comparatively freely therein at all times regardless of the direction of rotation of either of said members, the other groove of each pair defining a load run sized to receive the balls with less clearance than the return runs, the grooves of each pair being located with the load run of such pair positioned next to the load run of one adjacent pair and with the return run of such pair positioned next to the return run of the other adjacent pair whereby the balls in alternate load runs are loaded and transmit torque between said members when one of the members is turned in one direction and the balls in the remaining load runs are loaded and transmit torque between the members when said one member is turned in the opposite direction and whereby said balls circulate comparatively freely in said return runs regardless of the direction of rotation of said one member.

2. In a ball spline assembly, the combination of, inner and outer telescoped members, one of said members having a series of circumferentially spaced channels alternating with radially projecting ribs, the other of said members having circumferentially spaced pairs of circumferentially spaced grooves with the grooves of each pair disposed between adjacent ribs and associated with one of said channels, a train of anti-friction balls captivated to circulate in each pair of grooves and in the associated channel to transmit torque between the members while permitting relative linear movement of the members, a first groove of each pair being a load groove and coacting with the side of the adjacent rib to define a load run sized to receive the balls tightly with an anti-backlash fit regardless of the direction of rotation of either of said members, the second groove of each pair being a return groove and coacting with the side of the adjacent rib to define a return run sized to receive the balls with clearance to enable the balls to circulate comparatively freely regardless of the direction of rotation of either of said members, and the grooves of each pair being located with the load groove of such pair positioned next to the load groove of one adjacent pair and with the return groove such pair positioned next to the return groove of the other adjacent pair.

3. A ball spline assembly as defined in claim 2 in which said balls are spherical and in which said grooves are of arcuate cross section, the radii of said return grooves being larger than the radii of said load grooves.

4. A ball spline assembly as defined in claim 3 in which the balls of at least one of said trains are sized relative to the associated load run so as to be deformed plastically when traveling in such load run.

5. In a ball spline assembly, the combination of, first and second telescoped members, said first member having circumferentially spaced pairs of circumferentially spaced grooves opening toward said second member, a train of anti-friction balls captivated in each pair of grooves to circulate therein as an incident to relative linear movement of said members, said second member having a series of circumferentially spaced and radially projecting ribs extending between the balls in adjacent grooves of adjacent pairs, alternate ones of said ribs being torque transmitting ribs operable to couple the members together for rotation in unison and each coacting with the two adjacent grooves to define load runs sized to receive the balls tightly with an anti-backlash fit regardless of the direction of rotation of either of said members, the remaining ones of said ribs being guide ribs and each coacting with the two adjacent grooves to define return runs sized to receive the balls with clearance to enable the balls to circulate comparatively freely regardless of the direction of rotation of either of said members.

6. In a ball spline assembly, the combination of, first and second telescoped members, said first member having an even number of circumferentially spaced sets of circumferentially spaced load and return grooves opening toward said second member, a train of anti-friction balls captivated in each set of grooves to circulate therein as an incident to relative linear movement of said members, said second member having a series of circumferentially spaced and radially projecting torque transmitting ribs engageable with the balls to couple said members together for rotation in unison, there being one-half as many torque transmitting ribs as pairs of grooves with each torque transmitting rib being disposed between the balls in the load grooves of adjacent sets of grooves and coacting with the load grooves to define load runs sized to receive the balls tightly with an anti-backlash fit regardless of the direction of rotation of either of said members, and said return grooves coacting with said second member to define return runs sized to receive the balls with clearance to enable the balls to circulate comparatively freely regardless of the direction of rotation of either of said members.

7. In a ball spline assembly, the combination of, first and second telescoped members, said first member having two circumferentially spaced sets of circumferentially spaced load and return grooves opening toward said second member with the load grooves of the two sets being disposed adjacent one another, a train of anti-friction balls captivated in each set of grooves, means connecting the ends of the load and return grooves of each set to one another to enable the balls to circulate in the grooves as an incident to relative linear movement of said members, said second member having a radially extending rib projecting between the trains of balls in the two load grooves to couple the members together for rotation in unison and coacting with the load grooves to define load runs of a predetermined radii, and said return grooves coacting with said second member to define return runs of a greater radii than said load runs to enable the balls to circulate comparatively freely regardless of the direction of rotation of either of said members.

* * * * *